US009986748B2

United States Patent
Lazzarini et al.

(10) Patent No.: US 9,986,748 B2
(45) Date of Patent: Jun. 5, 2018

(54) MACHINE AND METHOD FOR MAKING LIQUID OR SEMI-LIQUID FOOD PRODUCTS

(71) Applicant: ALI S.p.a.—CARPIGIANI GROUP, Milan (IT)

(72) Inventors: Roberto Lazzarini, Reggio Emilia (IT); Andrea Cocchi, Calderara di Reno (IT)

(73) Assignee: ALI S.P.A.—CARPIGIANI GROUP, Milan (IT)

( * ) Notice: Subject to any disclaimer, the term of this patent is extended or adjusted under 35 U.S.C. 154(b) by 578 days.

(21) Appl. No.: 14/624,635

(22) Filed: Feb. 18, 2015

(65) Prior Publication Data

US 2015/0245634 A1 Sep. 3, 2015

(30) Foreign Application Priority Data

Feb. 28, 2014 (IT) .............................. BO2014A0099

(51) Int. Cl.
*A23G 9/04* (2006.01)
*A47J 43/04* (2006.01)
(Continued)

(52) U.S. Cl.
CPC ............... *A23G 9/045* (2013.01); *A23G 9/08* (2013.01); *A23G 9/228* (2013.01); *A47J 43/04* (2013.01); *B01F 2215/0021* (2013.01)

(58) Field of Classification Search
CPC ................................. A23G 9/045; A47J 43/04
(Continued)

(56) References Cited

U.S. PATENT DOCUMENTS

2002/0179642 A1\* 12/2002 Gutierrez ......... A61B 17/00491
222/145.5
2007/0280041 A1\* 12/2007 Adent ...................... A01K 5/02
366/183.1
(Continued)

FOREIGN PATENT DOCUMENTS

EP 0596722 5/1994
EP 1849368 10/2007
(Continued)

OTHER PUBLICATIONS

Italian Search Report dated Oct. 22, 2014 for corresponding Italian application No. ITBO20140099.

*Primary Examiner* — David Sorkin
(74) *Attorney, Agent, or Firm* — Shuttleworth & Ingersoll, PLC; Timothy J. Klima (57) ABSTRACT

A machine for making liquid or semi-liquid food products includes a plurality of first containers containing a liquid or semi-liquid basic mixture and having a deformable wall, such that the space occupied by each first container depends on a quantity of basic mixture in the first container. A rigid second container forming a processing chamber for the basic mixture includes a mixer and mechanism for thermal treatment to convert the basic mixture into a liquid or semi-liquid product. A sensor providing a signal representing the quantity of basic mixture at least in one of the first containers is operatively connected to the second container. A command and control unit is connected to the sensor to receive the signal and configured to infer, based on the signal, a condition of absence of mixture in one of the first containers connected to the second container.

16 Claims, 4 Drawing Sheets

(51) Int. Cl.
*A23G 9/08* (2006.01)
*A23G 9/22* (2006.01)

(58) Field of Classification Search
USPC ............... 366/141, 142, 151.1, 152.2, 152.6
See application file for complete search history.

(56) References Cited

U.S. PATENT DOCUMENTS

2010/0139493 A1  6/2010  Nevarez et al.
2012/0000206 A1  1/2012  Erbs et al.

FOREIGN PATENT DOCUMENTS

JP   2005210967   8/2005
WO   2011094089   8/2011

\* cited by examiner

MACHINE AND METHOD FOR MAKING LIQUID OR SEMI-LIQUID FOOD PRODUCTS

This application claims priority to Italian Patent Application No. BO2014A000099 filed Feb. 28, 2014, which application is incorporated by reference herein.

BACKGROUND OF THE INVENTION

The present invention relates to a machine and method for making liquid or semi-liquid food products, in particular for ice cream or soft ice cream type products.

In the technical sector of the ice cream trade in question, there are (soft) ice cream machines which comprise a mixing and cooling cylinder, to which is associated a refrigerating unit and a mixer is also provided.

The mixing and cooling cylinder enables the finished product (ice cream or soft ice cream) to be made starting from a basic mixture fed through a further container.

The basic mixture is fed to the mixing and cooling cylinder through containers, that is to say, so-called ""Bag in Box"" flexible feeding containers, which basically comprise a flexible wall equipped with an opening (perforatable) for the outflow of the product.

These flexible type feeding containers are configured to deform during extraction of the product; in other words, their volume depends on the quantity of product inside them.

The operators often complain of problems in controlling the using up of the basic mixture during the hours when the machine is most in use, when the number of customers to be served is particularly high and the technical personnel are busy serving.

The using up of the basic mixture in the container causes a stoppage of the machine, which lasts until the empty container for feeding the basic mixture is replaced with a new container, full of mixture.

For this reason, there is a strongly felt need in the relevant field for monitoring the operating status of the machine so as to correctly plan the replacement of the containers, thereby avoiding extended machine stoppages.

Still more in detail, a strongly felt need in the sector in question is that of allowing a fast replacement, by the operator, of the feed container when it is empty.

SUMMARY OF THE INVENTION

The aim of this invention is therefore to overcome the above-described drawbacks and to meet the above-mentioned need.

More specifically, the aim of this invention is to provide a machine and a method for making liquid or semi-liquid products which meet the above-mentioned needs.

Yet another aim of this invention is to provide a machine and a method for making liquid or semi-liquid products which allow the operating status of the machine to be monitored simply and quickly, so as to reduce extended machine stoppages.

These aims are achieved by a machine and a method which comprises technical features set out in the present disclosure.

BRIEF DESCRIPTION OF THE DRAWINGS

The technical features of the invention, with reference to the above aims, are clearly described in the annexed claims and its advantages are more apparent from the detailed description which follows, with reference to the accompanying drawings which illustrate a non-limiting embodiment of the invention and in which:

DESCRIPTION OF THE PREFERRED EMBODIMENTS

With reference to the accompanying drawings, the numeral 1 denotes an apparatus or machine for making liquid or semi-liquid products.

Preferably, the Machine 1 is a Machine for Making Ice Cream.

Still more preferably, the machine 1 is a machine for making soft ice am (or similar products, such as sorbets, etc.).

According to this invention, the machine 1 for making liquid or semi-liquid food products comprises a frame 2.

Moreover, the machine 1 comprises a plurality of first containers 3 containing a liquid or semi-liquid basic mixture and comprising a deformable wall 4, so that the space occupied by each first container 3 depends on a quantity of basic mixture in the self-same first container 3.

In other words, it should be noted that the machine 1 comprises two or more is plurality of) first containers 3.

The first containers 3 are preferably containers of the ""Bag in Box"" type.

In other words, the first containers 3 are containers defined by a deformable wall 4 which modifies the relative configuration/space as a function of the quantity of mixture inside it.

It should be noted that, according to this invention, the machine 1 comprises a second container 5 (rigid, that is to say, not deformable) forming a processing chamber for the basic mixture.

Preferably, the second container 5 has a cylindrical configuration.

Preferably, the second container 5 comprises a horizontal axis.

The second container 5 is equipped with a mixer 6 (driven by an electric motor) and means 7 for the thermal treatment of the basic mixture.

The mixer 6 also has the scraper function, that is to say, it is operates on the inside walls of the chamber for removing the layers of ice.

The mixer 6 and thermal treatment means 7 operate in conjunction with each other to convert the basic mixture into a liquid or semi-liquid product.

It should be noted that the thermal treatment means 7 comprise a refrigerating unit.

The refrigerating unit (not illustrated) preferably comprises a compressor, a condenser (air or water type), a laminating element and an evaporator, the latter associated with the second container 5.

Preferably, the second container 5 comprises a cylindrical processing container (or processing cylinder), which is open at one end to allow the product to be removed and access to the chamber."

The evaporator is associated with the side walls of the processing cylinder.

It should be noted that the mixer 6 is configured to scrape the inside walls of the processing chamber, in such a way as to scrape the ice and convert the basic mixture into a finished product of the ice cream type (preferably soft ice cream).

It should be noted that, according to this invention, the machine 1 preferably comprises means 8 for connecting the first containers 3 to the second container 5.

The connecting means 8 are configured for connecting (that is, placing in fluid communication) one of the first containers 3 to the second container 5 to transfer the basic mixture from one of the first containers 3 to the second container 5.

It should be noted that, preferably, the machine 1 is equipped with means 9 for supporting the first containers 3, operatively associated with the frame 2 and configured for supporting the first containers 3 (relative to the frame 2).

According to this invention, the machine 1 further comprises:
- at least one sensor 10 configured to make available a signal representative of the quantity of basic mixture at least in one of the first containers 3 which is connected to the second container 5;
- a command and control unit 11 (comprising one of more electronic cards), connected to the sensor 10 for receiving the signal and configured to infer, based on the signal, a condition of absence of mixture in one of the first containers 3 which is operatively connected to (in fluid connection with) the second container 5.

Figure 1:
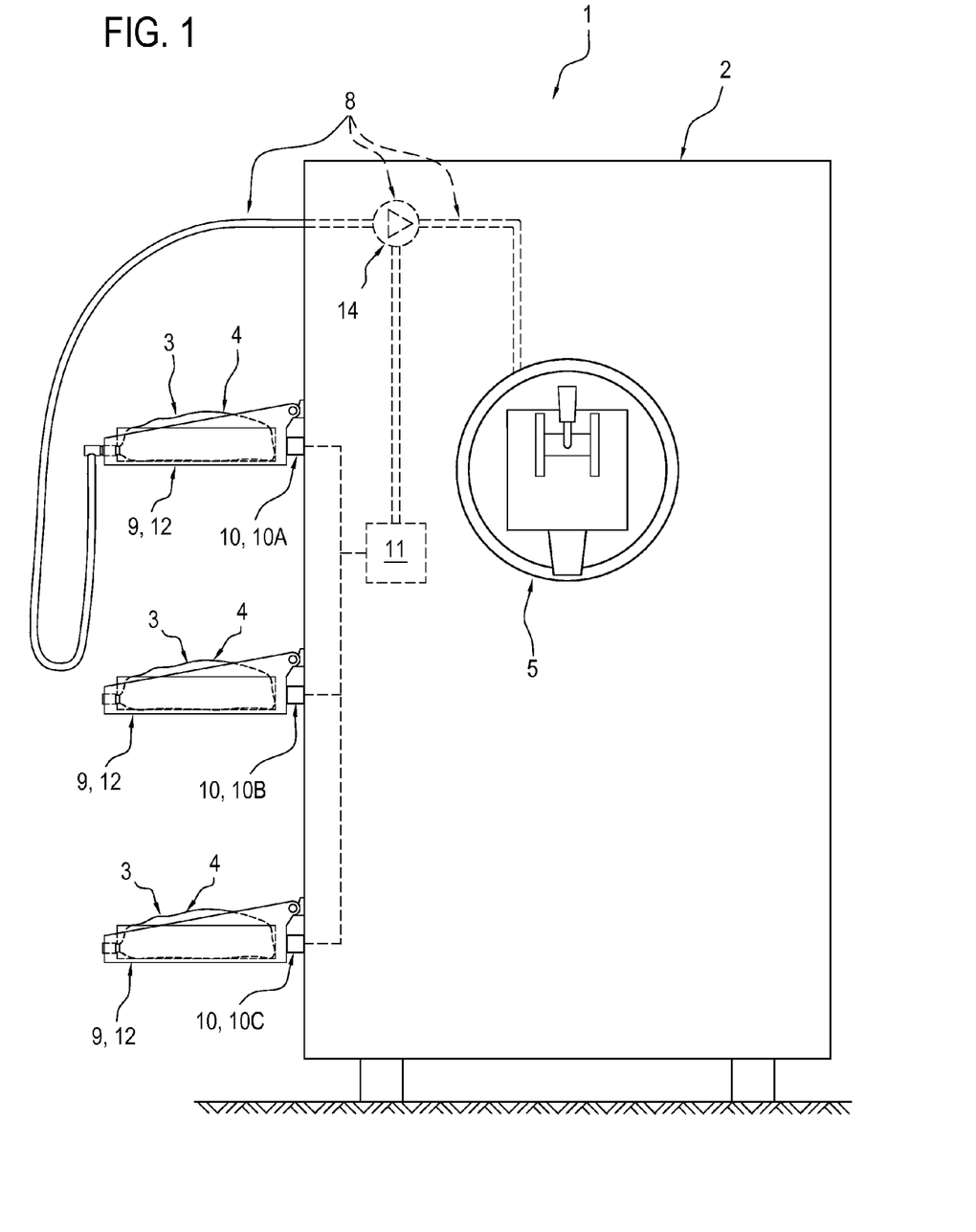
FIG. 1 is a schematic side view of a machine for making liquid or semi-liquid products according to this invention.
Figure 2:
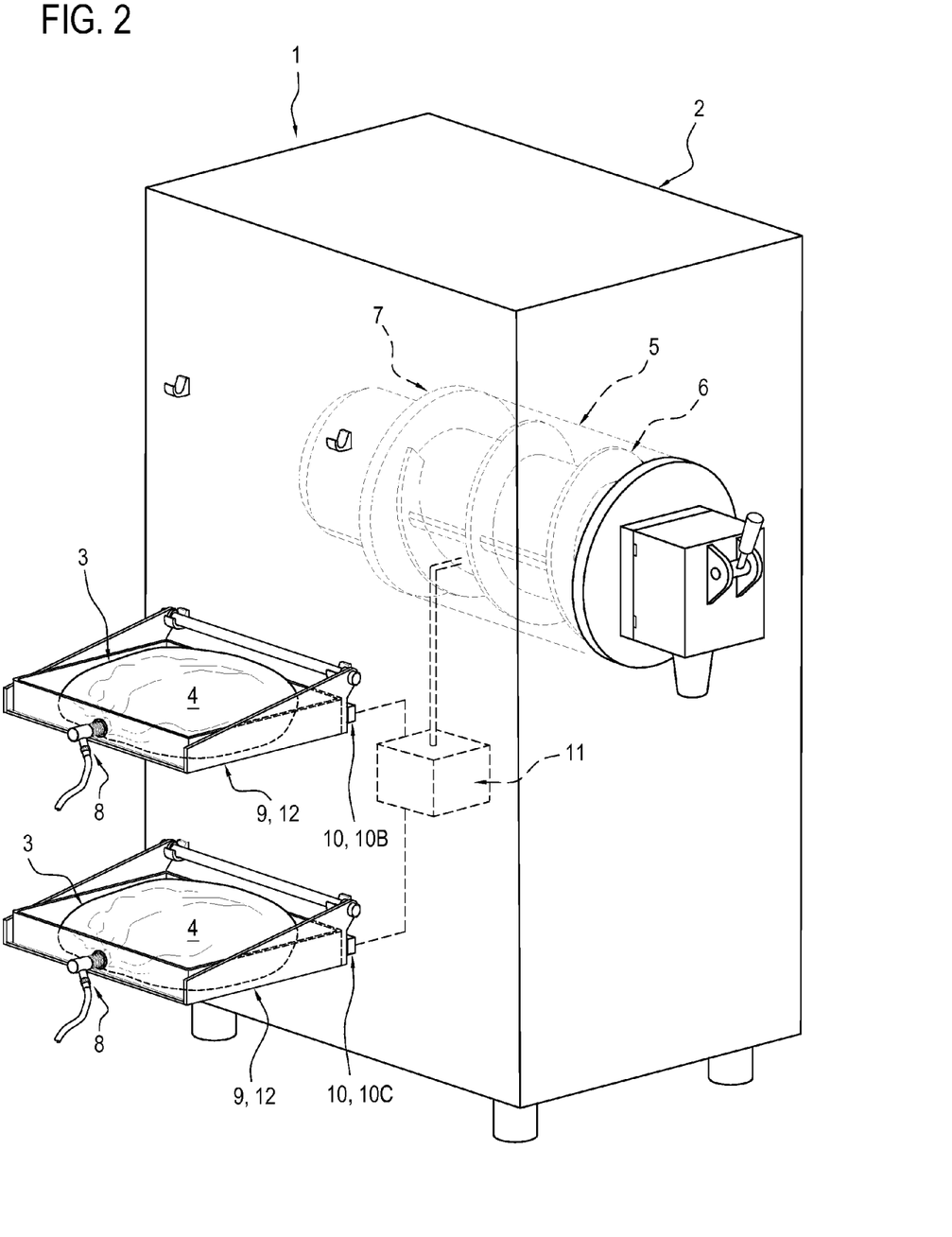
FIG. 2 is a schematic perspective view of the machine for making liquid or semi-liquid products of FIG. 1.

The preferred embodiment illustrated in FIGS. 1 and 2 is described below.

It should be noted that at least one sensor 10 is, preferably, configured to make available a signal representative of the weight of the basic mixture at least in one of the first containers 3 which is connected to the second container 5.

According to the preferred embodiment illustrated, the machine comprises a plurality of sensors 10A, 10B, 10C, each associated with a first container 3, for making available a signal representative of the quantity of basic mixture in the respective first container 3.

In other words, it should be noted that each sensor 10A, 10B, 10C makes available a signal representing the quantity of basic mixture in the respective first container 3 to which it is associated.

In the embodiment illustrated, the supporting means 9 comprise a plurality of holders 12.

The holders 12 are defined by a supporting surface.

Moreover, preferably, the holders 12 comprise supporting side walls.

Each of the holders 12 supports one of the first containers 3.

Preferably, the holders 12 are hinged relative to the frame 2, allowing them to rotate about an axis (preferably horizontal).

More specifically, it should also be noted that, preferably, each holder 12 is rotatably coupled to the frame 2.

Moreover, according to another aspect, the holder 12 is removably connected to the frame 2.

It should be noted that, for convenience of description, FIG. 2 shows, for reasons of simplicity, only two holders 12.

It should be noted that each of the sensors 10 is operatively interposed between the frame 2 and one of the holders 12, for making available a signal representative of the weight at least of a holder 12 and of a first container 3 (when resting on the holder 12), the signal representative of the weight depending (in an almost proportional manner) on the quantity of mixture in the respective first container 3.

In a preferred embodiment, the sensors 10 comprise load cells.

Each load cell is interposed between the frame 2 and one of the holders 12 for measuring the weight (that is, a force directly correlated with the weight) of one of the holders 12 (the one with which the cell is associated) and of the respective first container 3 supported by the holder 12.

It should be noted that the holder 12, when coupled to the frame 2, comes into contact, due to the effect of its natural weight, with the sensor 10 exerting on it a force substantially proportional to the weight of the holder 12 and of each object positioned on it (such as the first container 3).

The sensor 10 is therefore configured to generate a signal substantially proportional to the force applied on it due to the weight of the holder 12 and the first container 3 positioned on the holder 12.

In this way, during use of the machine 1, the signal of the sensor 10 is indicative of the quantity of the mixture inside the first container 3.

Figure 3:
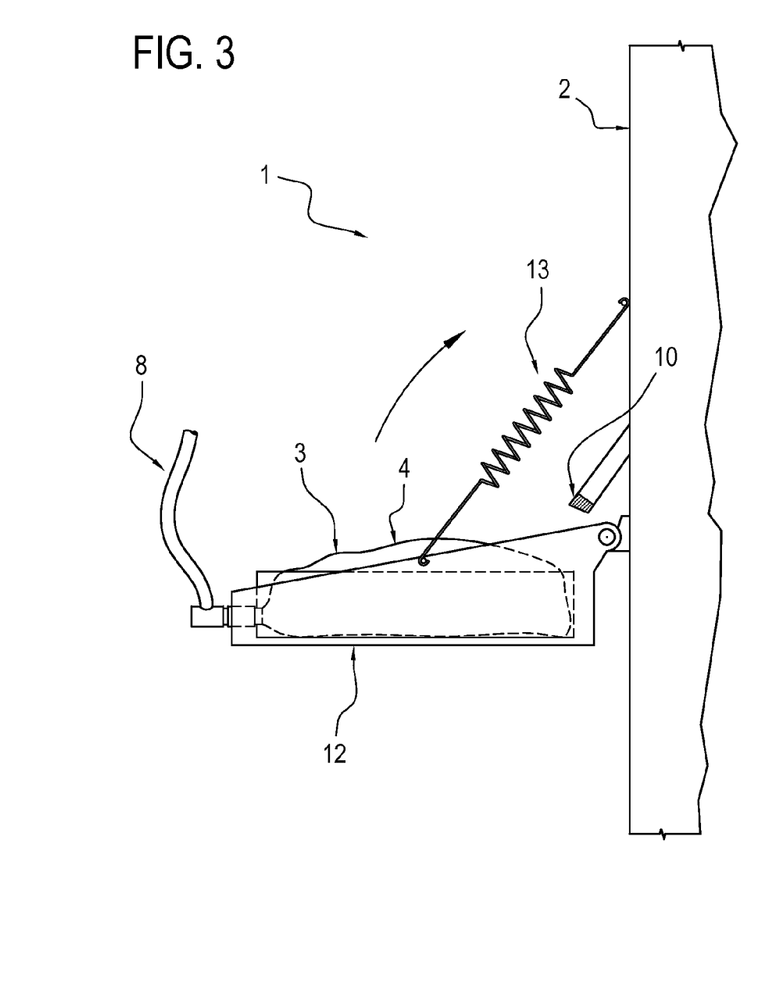
FIGS. 3 and 4 are respective schematic side views of another embodiment of the machine according to this invention in two different configurations.
Figure 4:
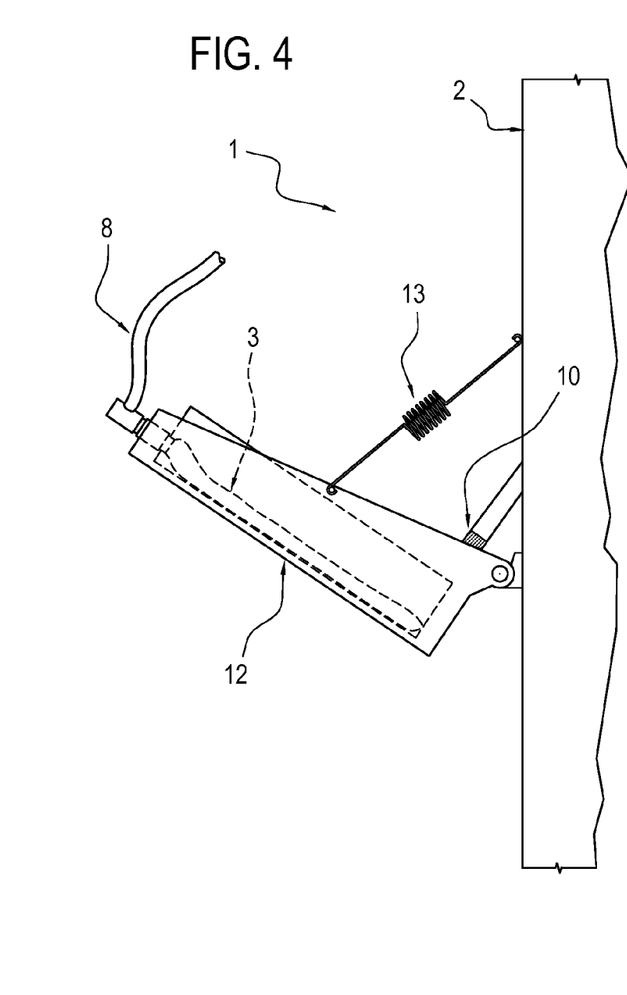

According to another embodiment illustrated in FIGS. 3 and 4, the machine 1 comprises, for each holder 12, at least one elastic element 13 (preferably a spring) operatively coupled to the frame 2 and the holder 12 to allow the frame 2 to support the holder 12.

The elastic element 13 here ore interposed between the holder 12 and the frame 2.

Moreover, the elastic element 13 is configured to deform (extend shorten) as a function of the weight of the holder 12 and the first container 3.

For this reason, the holder 12 is positioned in a predetermined position as a function of the weight of the first container positioned on it and the return force of the elastic element 13.

It should be noted that the holder 12 is mobile relative to the frame 2 between a first container 3 loaded position (preferably substantially horizontal), corresponding to a condition in which the respective first container 3 is completely full of the mixture, and a first container 3 empty position (preferably inclined) corresponding to a condition of absence of mixture in the respective first container 3.

According to this embodiment, the sensors 10 are configured to detect a position of the holders 12 in the position of the first container 3 empty, corresponding to a condition of absence of mixture in the respective first container 3.

According to a first aspect, the command and control unit 11 is configured to make an indication available to the user after the condition of absence of mixture in one of the first containers 3 which is connected to the second container 5 has been inferred.

According to this aspect, the user advantageously receives, substantially almost in real time, a signal (visual or audio or in another manner) regarding the fact that the first container 3 in use (that is to say, the one which is operatively connected to, that is in fluid communication with, the second container 3) is empty.

In this way, the user can intervene immediately for replacing the first container 3, thereby reducing to a minimum the machine down time (that is, to the time only necessary to replace the first container 3).

Advantageously, according to this aspect, the user can connect to the second container 5 a further first container 3 (between those present in the machine 1), loaded with basic mixture and which is already present in the machine (positioned on one of the holders 12 and still not used).

According to this aspect, the user perforates the first container 3 making an opening, and places the opening in fluid communication (through pipes, pump, etc., that is to say, through the connecting means 8) with the second container 5.

According to yet another aspect, the means 8 for connecting the first containers 3 to the second container 5 also comprise at least a transfer pump 14.

The transfer pump 14 is configured to allow the transfer of basic mixture from the first containers 3 to the second container 5. Preferably, the transfer pump 14 is a peristaltic pump.

According to another aspect, the connecting means 8 are configured for selectively connecting the transfer pump 14 to, and disconnecting the pump 14 from, each of the first containers 3.

In other words, the command and control unit 11 is connected to the connecting means 8 to control the connecting means 8 for establishing the connection of the transfer pump 14 to one (further) of the first containers 3, which is completely full, after a condition of absence of mixture in the first container 3 which is connected to the transfer pump 14 has been inferred (using the signal of sensor 10).

According to this aspect, the command and control unit 11 preferably comprises a memory to save (store) a parameter representing the status of each first container 3 (for example presence/absence of mixture).

According to another aspect, the command and control unit 11 is programmable to allow adjustment of a threshold level of the signal representing the quantity of basic mixture at least in one of the first containers 3 connected to the second container 5.

According to this aspect, the command and control unit 11 derives (is configured to derive) the above-mentioned condition of absence of mixture if the signal representing the quantity of basic mixture detected using the sensor 10 is less than the threshold level.

In other words, the threshold level establishes a lower limit for the detected signal below which the absence of product inside the first container 3 is established (derived).

The fact of being able to adjust the threshold level makes the machine 1 extremely precise in detecting the condition of absence of product.

Figure 5:
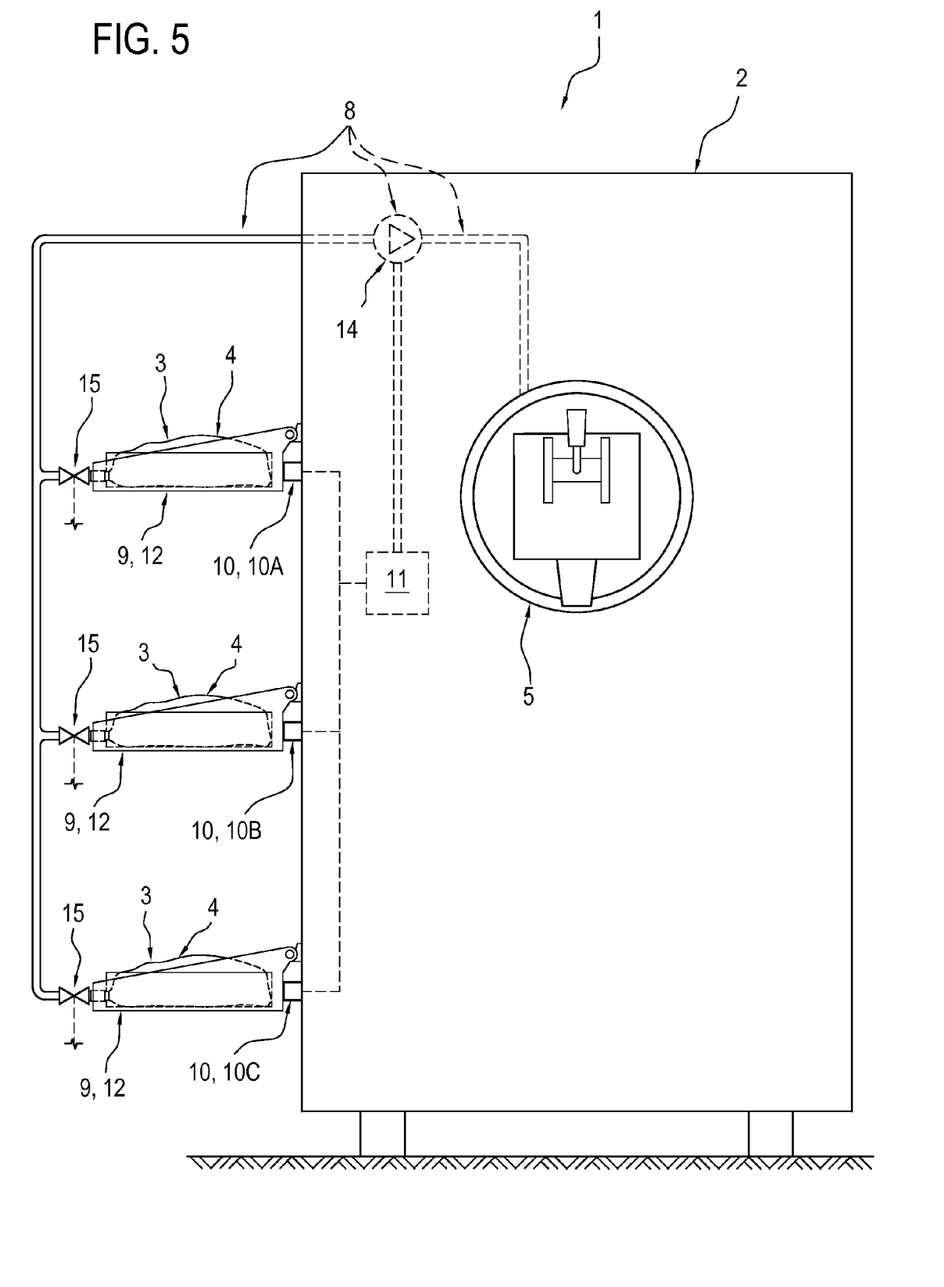
FIG. 5 is a schematic side view of a further embodiment of the machine for making liquid or semi-liquid products according to this invention.

According to the embodiment illustrated in FIG. 5, the selective connecting means 8 comprise a plurality of pipes 15, positioned parallel to and connecting the first containers 3 to the transfer pump 15, and closing means for closing each of the pipes 15, which can be activated and deactivated by the command and control unit 11 to allow the connection of a preset first container 3, which is completely full, to the transfer pump 14.

The operation of the machine 1 according to the invention, from which further technical advantages may be inferred, is briefly described below.

Irrespective of the type or the configuration of the machine 1, the sensor 10 makes it possible to obtain (on the basis of the signal representing the quantity of mixture in the first container 3 provided by the sensor itself) a condition of absence of basic mixture in the first container 3 in use, that is, in the first container 3 connected to the second container 5.

It should be noted that, in this way, the operator can have an immediate feedback regarding the fact that the first container 3 in use is empty (so as to immediately arrange the replacement) or the machine 1 can automatically replace the first container 3.

Advantageously, according to the embodiment shown in FIG. 5, the machine 1 is able, almost automatically, to switch the feeding of basic mixture to the second container 5, connecting a further first container 3 which is completely full as soon as the first container 3 in use is empty (that is to say, a condition of absence of mixture has been inferred).

It should also be noted that, in this way, the machine 1 can operate in perfect autonomy in an automatic manner, switching the feeding of the mixture from a first container 3 (in use) to another as soon as the first container 3 in use has finished its basic mixture.

For this reason, according to this aspect, the machine 1 is able to operate autonomously for long periods, without requiring intervention by technical personnel and without causing undesired machine stoppages.

It should also be noted that, advantageously, the machine 1 according to all the embodiments described makes it possible to use all the contents of each first container 3: in effect, the user (or, automatically, the machine 1) replaces the first container 3 only when the contents of the first container 3 in use are completely finished.

In this way, not only is the overall stoppage time of the machine reduced (which is a particularly important aspect when the machine is used, for example, directly by the end user) but the waste of basic mixture is also reduced, by an almost complete use of the mixture.

According to this invention, a method is also defined for making liquid or semi-liquid food products (in particular for making ice cream, or, more preferably, soft ice cream), starting from a basic mixture comprising the following steps:

a) preparing a plurality of first containers 3 containing a basic mixture and comprising a deformable wall 4, so that the space occupied by each first container 3 depends on a quantity of basic mixture in the self-same first container 3;

b) preparing a rigid second container 5 forming a processing chamber for the basic mixture;

c) connecting one of the first containers 3 to the second container 5 and transferring the basic mixture from the one of the first containers 3 to the second container 5;

d) mixing the basic mixture in the second container 5 and thermally treating the basic mixture to convert the mixture into a finished product;

e) detecting a signal representative at least of the quantity of basic mixture in the first container 3 which is connected to the second container 5, for inferring, based on the signal, a condition of absence of mixture in the first container 3 which is connected to the second container 5;

f) connecting to the second container 5, after the condition of absence of mixture in the first container 3 which is connected to the second container 3 has been inferred, a further first container 3 of the first containers 3 which is completely full, for allowing a transfer of the basic mixture from the further first container 3 to the second container 5.

According to a first aspect, the step of detecting a signal representative of the quantity of basic mixture in one or more of the first containers 3 comprises a step of detecting the weight at least of the first container 3 which is connected to the second container 5.

According to yet another aspect, the step f) of connecting to the second container 5 a further first container 3, comprises a step of disconnecting from the second container 5 the first container 3 for which the condition of absence of mixture was inferred.

What is claimed is:

1. A machine for making liquid or semi-liquid food products, comprising:
   a frame;
   a plurality of first containers each containing a liquid or semi-liquid basic mixture and comprising a deformable wall, so that a space occupied by each first container depends on a quantity of basic mixture in the first container;
   a second container, which is rigid, forming a processing chamber for the basic mixture, the second container including a mixer and a thermal treatment system for the basic mixture, operating in conjunction with one another to convert the basic mixture into a liquid or semi-liquid product;
   a connecting duct system for connecting the first containers to the second container and configured to operatively connect one of the first containers to the second container and to transfer the basic mixture from the one of the first containers to the second container;
   a supporting system for the first containers, operatively associated with the frame, the supporting system including a supporting surface for each of the first containers,
   at least one sensor configured to make available a signal representative of the quantity of basic mixture at least in the one of the first containers which is operatively connected to the second container;
   a control and actuator unit, connected to the at least one sensor for receiving the signal and programmed to infer, based on the signal, a condition of absence of basic mixture in the one of the first containers which is operatively connected to the second container;
   wherein the connecting duct system comprises a pipe connecting the second container and the first containers, a transfer pump for transferring the basic mixture from the first containers through the transfer pump to the second container disposed along the pipe, and a closure valve for closing the pipe;
   wherein the control and actuator unit is connected to the connecting duct system for establishing an automatic operative connection of the transfer pump to a further one of the first containers, which is filled with basic mixture, after inferring the absence of basic mixture in the one of the first containers which is operatively connected to the second container.

2. The machine according to claim 1, wherein the at least one sensor is configured to make available a signal representative of a weight of the basic mixture at least in the one of the first containers which is operatively connected to the second container.

3. The machine according to claim 1, wherein the at least one sensor comprises a plurality of sensors, each of the sensors being associated with a respective one of the first containers, for making available a signal representative of a quantity of basic mixture in the respective one of the first containers.

4. The machine according to claim 3, wherein the supporting system comprises a plurality of holders, each of the holders including a supporting surface supporting a respective one of the first containers.

5. The machine according to claim 4, wherein each of the sensors is operatively interposed between the frame and one of the holders, for making available a signal representative of a weight of the one of the holders and the respective one of the first containers, the weight depending on the quantity of basic mixture in the respective one of the first containers.

6. The machine according to claim 4, wherein each holder is hinged relative to the frame to be rotatable about a respective axis.

7. The machine according to claim 4, wherein the sensors are load cells, each interposed between the frame and one of the holders for making available a signal relative to a weight of the one of the holders and the respective one of the first containers supported by the one of the holders.

8. The machine according to claim 4 and further comprising, for each holder, at least one elastic element operatively coupled to the frame and to the holder to support the holder from the frame and configured to deform depending on a weight of the holder and the respective one of the first containers, the holder being movable relative to the frame between a first container loaded position, corresponding to a condition in which the respective one of the first containers is full of the basic mixture and a first container empty position, corresponding to a condition of absence of basic mixture in the respective one of the first containers, the sensors being configured to detect at least a positioning of the holder in the first container empty position.

9. The machine according to claim 1, wherein said control and actuator unit is configured to make an indication available to a user after inferring the absence of basic mixture in the one of the first containers which is operatively connected to the second container has been inferred.

10. The machine according to claim 1, wherein the connecting duct system is configured to allow selective connection of the transfer pump to, and disconnection of the transfer pump from, each of the first containers.

11. The machine according to claim 1, wherein the connecting duct system comprises a plurality of pipes connecting the first containers to the transfer pump, and a plurality of closure valves for closing respective ones of the pipes, which closure valves are activated and deactivated by the control and actuator unit to allow connection of one of the first containers, which is full, to the transfer pump.

12. A method for making liquid or semi-liquid food products, starting with a basic mixture, comprising:
   providing:
      a frame;
      a plurality of first containers each containing a liquid or semi-liquid basic mixture and comprising a deformable wall, so that a space occupied by each first container depends on a quantity of basic mixture in the first container;
      a second container, which is rigid, forming a processing chamber for the basic mixture, the second container including a mixer and a thermal treatment system for the basic mixture, operating in conjunction with one another to convert the basic mixture into a liquid or semi-liquid product;
      a connecting duct system for connecting the first containers to the second container and configured to operatively connect one of the first containers to the second container and to transfer the basic mixture from the one of the first containers to the second container;
      a supporting system for the first containers, operatively associated with the frame, the supporting system including a supporting surface for each of the first containers,
      at least one sensor configured to make available a signal representative of the quantity of basic mixture at least in the one of the first containers which is operatively connected to the second container;

a control and actuator unit, connected to the at least one sensor for receiving the signal and programmed to infer, based on the signal, a condition of absence of basic mixture in the one of the first containers which is operatively connected to the second container;

wherein the connecting duct system comprises a pipe connecting the second container and the first containers, a transfer pump for transferring the basic mixture from the first containers through the transfer pump to the second container disposed along the pipe, and a closure valve for closing the pipe;

wherein the control and actuator unit is connected to the connecting duct system for establishing an automatic operative connection of the transfer pump to a further one of the first containers, which is filled with basic mixture, after inferring the absence of basic mixture in the one of the first containers which is operatively connected to the second container;

operatively connecting the one of the first containers to the second container and transferring the basic mixture from the one of the first containers to the second container;

mixing the basic mixture in the second container and thermally treating the basic mixture in the second container to convert the basic mixture into a finished product;

detecting the signal representative of the quantity of basic mixture in the one of the first containers operatively connected to the second container, and inferring with the control and actuator unit, the condition of absence of the basic mixture in the one of the first containers operatively connected to the second container;

connecting to the second container, after the condition of absence of basic mixture in the one of the first containers operatively connected to the second container has been inferred, the further one of the first containers which is full, for allowing a transfer of the basic mixture from the further one of the first containers to the second container.

13. The method according to claim 12, wherein the detecting the signal representative of the quantity of basic mixture in the one of the first containers comprises detecting a weight at least of the one of the first containers which is connected to the second container.

14. The method according to claim 12, wherein the connecting to the second container, after the condition of absence of basic mixture in the one of the first containers operatively connected to the second container has been inferred, a further first container, comprises disconnecting from the second container the one of the first containers for which the condition of absence of basic mixture was inferred.

15. The machine according to claim 1, wherein the supporting system comprises a plurality of holders, each of the holders including a supporting surface supporting a respective one of the first containers.

16. The machine according to claim 15, wherein each holder is hinged relative to the frame to be rotatable about a respective axis.

* * * * *